United States Patent
Altaparmakov et al.

(10) Patent No.: US 10,417,196 B2
(45) Date of Patent: Sep. 17, 2019

(54) SYSTEMS AND METHODS FOR FAIL-SAFE OPERATIONS OF STORAGE DEVICES

(71) Applicant: Tuxera Corporation, Helsinki (FI)

(72) Inventors: Anton Ivanov Altaparmakov, Great Chesterford (GB); Szabolcs Szakacsits, Helsinki (FI)

(73) Assignee: Tuxera Inc., Espoo (FI)

( * ) Notice: Subject to any disclaimer, the term of this patent is extended or adjusted under 35 U.S.C. 154(b) by 1046 days.

(21) Appl. No.: 14/255,243

(22) Filed: Apr. 17, 2014

(65) Prior Publication Data
US 2015/0193461 A1 Jul. 9, 2015

Related U.S. Application Data

(60) Provisional application No. 61/924,136, filed on Jan. 6, 2014.

(51) Int. Cl.
| | |
|---|---|
| *G06F 16/18* | (2019.01) |
| *G06F 16/13* | (2019.01) |
| *G06F 16/16* | (2019.01) |
| *G06F 16/17* | (2019.01) |
| *G06F 16/182* | (2019.01) |
| *G06F 3/06* | (2006.01) |

(Continued)

(52) U.S. Cl.
CPC ............ *G06F 16/1847* (2019.01); *G06F 3/06* (2013.01); *G06F 7/00* (2013.01); *G06F 11/00* (2013.01); *G06F 11/1435* (2013.01); *G06F 11/1441* (2013.01); *G06F 13/00* (2013.01); *G06F 16/13* (2019.01); *G06F 16/16* (2019.01); *G06F 16/162* (2019.01); *G06F 16/1734* (2019.01); *G06F 16/1827* (2019.01)

(58) Field of Classification Search
CPC ........... G06F 17/30182; G06F 16/1847; G06F 16/16; G06F 16/13; G06F 16/162; G06F 16/1734; G06F 16/1827; G06F 11/1441; G06F 11/1435; G06F 11/00; G06F 13/00; G06F 7/00; G06F 3/06
USPC ................................ 707/674, 823; 714/100
See application file for complete search history.

(56) References Cited

U.S. PATENT DOCUMENTS 6,615,365 B1 * 9/2003 Jenevein ............. G06F 11/1417
711/161
7,613,738 B2 11/2009 Patel et al.
(Continued)

FOREIGN PATENT DOCUMENTS

WO 2011/003460 A1 1/2011

OTHER PUBLICATIONS

International Search Report and Written Opinion for PCT/US14/46139 dated Dec. 17, 2014, pp. 11.
(Continued)

*Primary Examiner* — James E Richardson
(74) *Attorney, Agent, or Firm* — J. Fish Law, PLLC

(57) ABSTRACT

Techniques for enabling fail-safe operations of storage devices are described. A device may be configured to delete an inode in a failsafe manner. A device may be configured to mark directory entries as not in use and ensure this goes to disk before anything else. A device may be configured to create an inode in a failsafe manner. A device may be configured to allocate and initialize a cluster and ensure this is written to disk before anything else. In this manner, a volume may be in a predictable state upon a failure occurring.

17 Claims, 11 Drawing Sheets

(51) Int. Cl.
  *G06F 7/00*     (2006.01)
  *G06F 13/00*    (2006.01)
  *G06F 11/00*    (2006.01)
  *G06F 11/14*    (2006.01)

(56) References Cited

U.S. PATENT DOCUMENTS

| | | | |
|---|---|---|---|
| 7,702,659 B2 | 4/2010 | Ban et al. | |
| 8,321,439 B2 | 11/2012 | Pudipeddi et al. | |
| 8,463,802 B2 | 6/2013 | Lin et al. | |
| 8,484,258 B2 | 7/2013 | Anderson, Sr. et al. | |
| 8,606,830 B2 | 12/2013 | Pudipeddi et al. | |
| 9,542,396 B1* | 1/2017 | Pawar | G06F 11/14 |
| 2003/0088591 A1* | 5/2003 | Fish | G06F 17/30902 |
| | | | 707/707 |
| 2004/0139291 A1 | 7/2004 | Hocker et al. | |
| 2004/0193564 A1 | 9/2004 | Ban et al. | |
| 2005/0065986 A1* | 3/2005 | Bixby | G06F 17/30088 |
| | | | 707/707 |
| 2005/0270930 A1* | 12/2005 | Uemura | G06F 21/64 |
| | | | 369/47.1 |
| 2006/0161642 A1* | 7/2006 | Bopardikar | G06F 3/061 |
| | | | 709/219 |
| 2009/0106327 A1 | 4/2009 | Dilman et al. | |
| 2009/0265400 A1 | 4/2009 | Puddipeddi et al. | |
| 2009/0164440 A1 | 6/2009 | Pudipeddi et al. | |
| 2010/0082537 A1 | 4/2010 | Lasser | |
| 2010/0280995 A1* | 11/2010 | Munegowda | G06F 11/1435 |
| | | | 707/648 |
| 2011/0022566 A1 | 1/2011 | Beaverson et al. | |
| 2011/0125816 A1* | 5/2011 | Shapiro | G06F 8/61 |
| | | | 707/828 |
| 2012/0047154 A1 | 2/2012 | Lin et al. | |
| 2014/0279950 A1* | 9/2014 | Shapiro | G06F 17/3012 |
| | | | 707/692 |

OTHER PUBLICATIONS

International Preliminary Report on Patentability for PCT/US14/46139 dated Jan. 4, 2016, pp. 8.

Microsoft Corporation, "Microsoft Extensible Firmware Initiative FAT32 File System Specification", Hardware White Paper, Version 1.03, Dec. 6, 2000, 34 pp.

Microsoft Extensible Firmware Initiative FAT32 File System Specification (FAT: General Overview of On-Disk Format), Designing Hardware for Microsoft Operating Systems, Version 1.03 (2000).

Extended European search report for EP Application No. 148761115.8 dated Jul. 12, 2017, pp. 8.

* cited by examiner

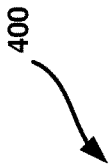

| DIRECTORY ENTRY RECORD 402 | BYTE 0 | BYTE 1 | BYTE 2-3 | BYTE 4-5 | BYTE 6-7 | BYTE 8-24 | BYTE 25-31 |
|---|---|---|---|---|---|---|---|
| | TYPE | NO. OF 32 BYTES | CHECKSUM | DOS FILE FLAGS | RESERVED | TIME DATA | RESERVED |

| STREAM EXTENSION RECORD 404 | BYTE 0 | BYTE 1 | BYTE 2-3 | BYTE 4-5 | BYTE 6-7 | BYTE 8-15 | BYTE 16-19 | BYTE 20-23 | BYTE 24-31 |
|---|---|---|---|---|---|---|---|---|---|
| | TYPE | NO_FAT_CHAIN BIT | RESERVED / NAME SIZE | NAME HASH | RESERVED | VALID DATA LENGTH | RESERVED | FIRST CLUSTER | DATA SIZE |

| FILE NAME EXTENSION RECORD(S) 406 | BYTE 0 | BYTE 1 | BYTE 2-31 |
|---|---|---|---|
| | TYPE | RESERVED | FILE NAME |

FIG. 4A

SYSTEMS AND METHODS FOR FAIL-SAFE OPERATIONS OF STORAGE DEVICES

This application claims the benefit of U.S. Provisional Application No. 61/924,136, filed on Jan. 6, 2014, which is incorporated by reference in its entirety.

TECHNICAL FIELD

This disclosure relates to systems and methods for use with file systems and more particularly to techniques for enabling fail-safe operations of storage devices.

BACKGROUND

Devices including laptop or desktop computers, tablet computers, televisions, digital video recorders, set-top boxes, digital media players, video gaming devices, video game consoles, and cellular telephones may utilize file systems to control how data is stored on and retrieved from a computer readable medium. For example, a device may read and/or write data to a storage device, such as, a memory card (e.g., a Secure Digital (SD) memory card, including Standard-Capacity (SDSC), High-Capacity (SDHC), and eXtended-Capacity (SDXC) formats), a hard disk drive, and/or a solid state drive including a Universal Serial Bus (USB) solid state drive (so-called "flash," "thumb," or "jump" drives) according to a defined file system. Types of file systems include, for example, files systems based on the Extended File System (ext), file systems based on the Hierarchical File System (HFS), file systems based on the XFS file system, file systems based on the ZFS file system, file systems based on the New Technology File System (NTFS), and file systems based on File Allocation Table (FAT) file systems, including the FAT12, FAT16, FAT32, exFAT, and transactional exFAT files systems.

Users of devices do not always unmount a volume before unplugging or turning off a device and/or the storage device. Further, a storage device can accidentally be unplugged from the device and/or from a power supply or a device can simply run out of battery power during operation.

SUMMARY

In general, this disclosure describes techniques for enabling fail-safe operations of storage devices. In particular, this disclosure describes techniques for allocating clusters, deallocating clusters, creating an inode, deleting an inode, renaming an inode, and combinations thereof.

According to one example of the disclosure, a method for deleting an inode comprises marking directory entries as not in use, and subsequently, freeing clusters associated with the directory entries marked as not is use.

According to another example of the disclosure, a device for deleting an inode comprises one or more processors configured to marking directory entries as not in use, and subsequently, free clusters associated with the directory entries marked as not is use.

According to another example of the disclosure, a non-transitory computer-readable storage medium comprises instructions stored thereon, that upon execution, cause one or more processors of a device to mark directory entries as not in use, and subsequently, free clusters associated with the directory entries marked as not is use.

According to another example of the disclosure, an apparatus for deleting an inode comprises means for marking directory entries as not in use, and means for subsequently, freeing clusters associated with the directory entries marked as not is use.

According to one example of the disclosure, a method for creating a directory comprises allocating a cluster for the directory, initializing the allocated cluster, writing the initialized cluster to disk, and subsequently, writing directories entries to disk.

According to another example of the disclosure, a device for creating a directory comprises one or more processors configured to allocate a cluster for the directory, initialize the allocated cluster, write the initialized cluster to disk, and subsequently, write directories entries to disk.

According to another example of the disclosure a non-transitory computer-readable storage medium comprises instructions stored thereon, that upon execution, cause one or more processors of a device to allocate a cluster for the directory, initialize the allocated cluster, write the initialized cluster to disk, and subsequently, write directories entries to disk.

According to another example of the disclosure an apparatus for creating an inode comprises means for allocating a cluster for the directory, means for initializing the allocated cluster, means for writing the initialized cluster to disk, and means for subsequently, writing directories entries to disk.

The details of one or more examples are set forth in the accompanying drawings and the description below. Other features, objects, and advantages will be apparent from the description and drawings, and from the claims.

BRIEF DESCRIPTION OF DRAWINGS

FIG. 4A-4B are conceptual diagrams illustrating examples of directory entries that includes records associated with an inode.

DETAILED DESCRIPTION

Figure 1:
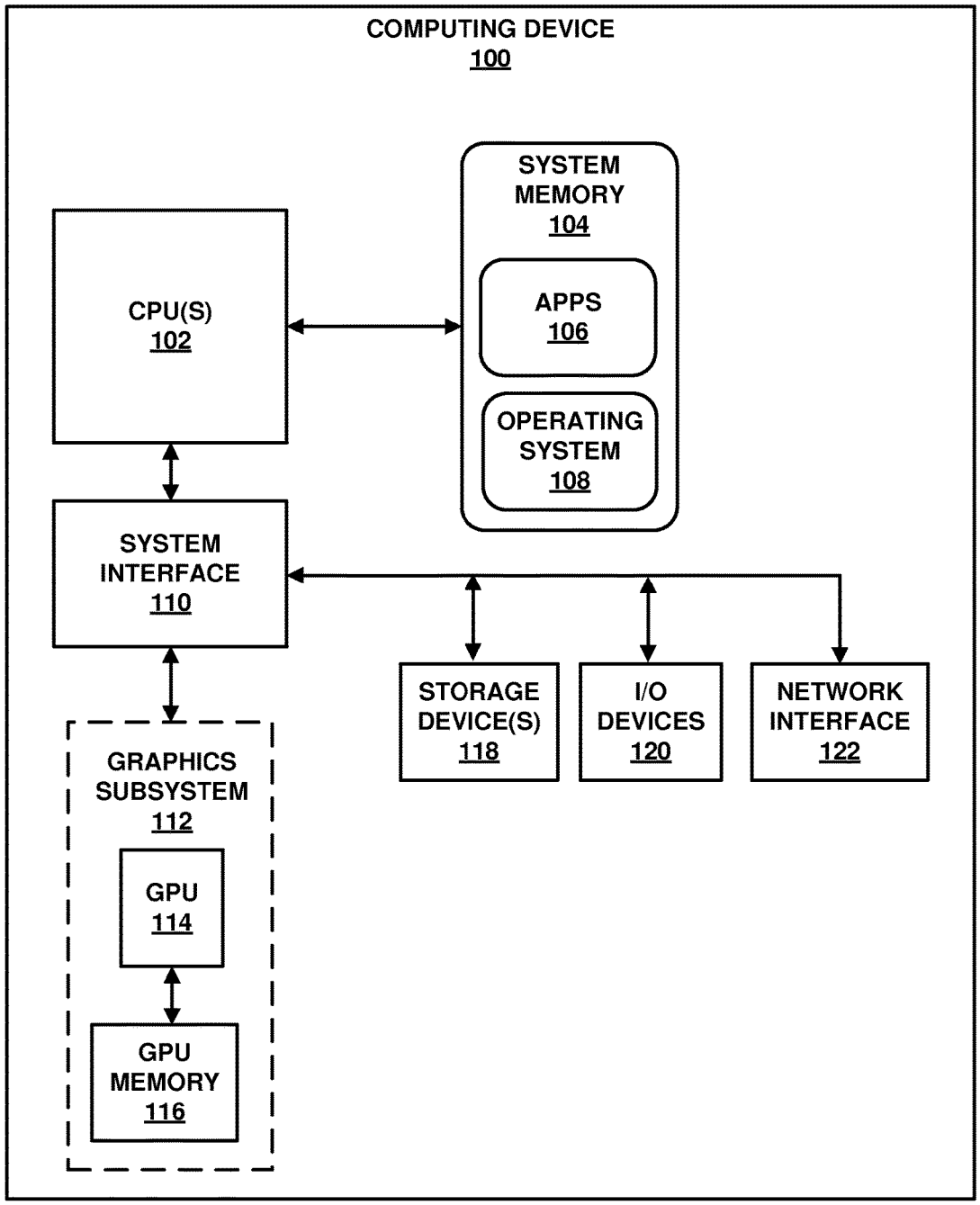
FIG. 1 is a block diagram illustrating an example of a computing device that may implement one or more techniques of this disclosure.

In general, this disclosure describes techniques for enabling fail-safe operations of storage devices. In one example, fail-safe operations may include leaving a volume consistent for different types of failures, such as, spontaneous power loss and/or unexpected storage device disconnections. Further, where leaving a volume consistent is not possible, fail-safe operations may include leaving a volume in a state that does not cause any data loss and/or leaving a volume in a state where data loss is able to be cleaned up when the data is subsequently accessed.

Storage devices may manage user data according to a defined file system. For example, the Microsoft Extensible Firmware Initiative FAT32 File System Specification (version 1.03 Dec. 6, 2000), which is herein incorporated by reference in its entirety, defines aspects of the FAT32 file system and Microsoft exFAT Revision 1.00 File System Basic Specification (fourth release, 1 Jan. 2009), which is described in Appendix A of U.S. Pat. No. 8,321,439, and which is herein incorporated by reference in its entirety, defines aspects of the exFAT file system. A file system may specify the structure and requirements of a volume, where a volume is a set of file system structures and data space necessary to store and retrieve user data. As described in detail below with respect to FIG. 3, a volume may include boot record(s), file allocation table(s), and a data region. User data may include directories and files, which may collectively referred to herein as inodes. When a storage device is unplugged or a power loss occurs before a volume is unmounted, data corruptions may occur. For example, both FAT and exFAT file systems may develop corruptions, such as, for example, cross linked clusters, lost clusters, corrupt directories, and corrupt files.

In some implementations, NTFS, ext3/4, and XFS file systems may use journaling to overcome problems associated with premature storage device removal or power loss. In some implementations, journaling may involve a performance penalty due to needing to maintain a journal on a storage device. It should be noted, that the FAT and exFAT specifications do not provide for journaling. Thus, adding a journal to FAT and exFAT file systems would require changing the defined specifications. This may not be feasible and would possibly result in incompatibilities with existing FAT and exFAT implementations.

Other file systems, such as ZFS, for example, may only write to new disk blocks, then switch references to point to the new blocks and then free the old blocks. Transactional exFAT may duplicate both a file allocation table and an allocation bitmap completely within a volume and include a pointer in a boot sector as to which of the two file allocation tables and two allocation bitmaps are currently active. In this manner, transactional exFAT system modifications may be made to the inactive file allocation table and the inactive allocation bitmap and when the modifications are complete, the active file allocation table and allocation bitmap pointers may be switched and the modifications may be synced to the other files allocation table and allocation bitmap. A disadvantage to the techniques used in the ZFS and transaction exFAT file systems is the potential performance drop from having to duplicate information within a volume.

In one example, the techniques described herein enable fail-safe operations and do not require some metadata write duplications. Metadata write duplications may be very expensive in terms of performance, such as, CPU usage and power consumption. Excessive power consumption may be particularly expensive for battery powered devices, such as for example, mobile devices. Examples of advantages of the techniques described herein over other methods like journaling, for example, is that the example techniques described herein may still achieve good performance and that no write amplification occurs (i.e., both journaling and even more so duplicating data like in Transactional FAT/ exFAT and in ZFS cause things to keep being written anew which may be less than ideal for flash based media which has a finite write-cycle count before failure).

FIG. 1 is a block diagram illustrating an example of a computing device that may implement one or more techniques of this disclosure. Computing device 100 may include one or more processors and a plurality of internal and/or external storage devices. Examples of storage devices include file servers, FTP servers, network attached storage (NAS) devices, a local disk drive, removable memory devices, such as, for example, memory cards and USB memory devices, or any other type of device or storage medium capable of storing data. Storage medium may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

Computing device 100 is an example a computing device configured to store data on or retrieved data from a computer readable medium. Data may include, for example, application files, document files, and/or media files (audio and/or video files). Computing device 100 may be equipped for wired and/or wireless communications and may include devices, such as, for example, desktop or laptop computers, mobile devices, smartphones, cellular telephones, personal data assistants (PDA), tablet devices, set top boxes, personal gaming devices, and automotive infotainment systems. As illustrated in FIG. 1, computing device 100 includes central processor unit(s) 102, system memory 104, system interface 110, graphics subsystem 112, storage device(s) 118, I/O device(s) 120, and network interface 122. As illustrated in FIG. 1, system memory 104 includes applications 106 and operating system 108. Further, as illustrated in FIG. 1, graphics subsystem 112 includes graphics processing unit 114 and GPU memory 116. It should be noted that although example computing device 100 is illustrated as having distinct functional blocks, such an illustration is for descriptive purposes and does not limit computing device 100 to a particular hardware or software architecture. Functions of computing device 100 may be realized using any combination of hardware, firmware and/or software implementations.

Central processing unit(s) 102 may be configured to implement functionality and/or process instructions for execution in computing device 100. Central processing unit (s) 102 may be capable of retrieving and processing instructions, code, and/or data structures for implementing one or more of the techniques described herein. Instructions may be stored on a computer readable medium, such as system memory 104 or storage devices 118. Central processing unit(s) 102 may include digital signal processors (DSPs), general purpose microprocessors, application specific integrated circuits (ASICs), field programmable logic arrays (FPGAs), or other equivalent integrated or discrete logic circuitry. Central processing unit(s) 102 may include one or more multi-core central processing units. Central processing unit(s) 102 may be configured such that dedicated graphic processing units, such as those included in graphics subsystem 112, are used for graphics processing.

System memory 104 may be configured to store information that may be used by computing device 100 during operation. System memory 104 may be described as a non-transitory or tangible computer-readable storage medium. In some examples, system memory 104 may provide temporary memory and/or long-term storage. In some examples, system memory 104 or portions thereof may be described as non-volatile memory and in other examples portions of system memory may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. In one example, system memory may include an internal hard disk drive and/or an internal flash memory.

System interface 110 may be configured to enable communication between components of computing device 100. In one example, system interface 110 comprises structures that enable data to be transferred from one peer device to another peer device or to a storage medium. For example, system interface 110 may include a chipset supporting PCI bus, PCIe bus protocols, proprietary bus protocols, or any other form of structure that may be used to interconnect peer devices.

Storage device(s) 118 represents memory of computing device 100 that may be configured to store different amounts of information for different periods of time than system memory 104. Similar to system memory 104, storage device(s) 118 may also include one or more non-transitory or tangible computer-readable storage media. Storage device(s) 118 may be internal or external memory and in some examples may include non-volatile storage elements. Storage device(s) may include memory cards (e.g., a Secure Digital (SD) memory card, including Standard-Capacity (SDSC), High-Capacity (SDHC), and eXtended-Capacity (SDXC) formats), external hard disk drives, and/or an external solid state drive. Data stored on storage device(s) 118 may be stored according to a defined file system, such as, for example FAT12, FAT16, FAT32, exFAT, and/or transactional exFAT files systems.

I/O device(s) 120 may be configured to receive input and provide output for computing device 100. Input may be generated from an input device, such as, for example, touch-sensitive screen, track pad, track point, mouse, a keyboard, a microphone, video camera, or any other type of device configured to receive input. Output may be provided to output devices, such as, for example speakers or a display device. In some examples, I/O device(s) 120 may be external to computing device 100 and may be operatively coupled to computing device 100 using a standardized communication protocol, such as for example, Universal Serial Bus protocol (USB).

Network interface 122 may be configured to enable computing device 100 to communicate with external computing devices via one or more networks. Network interface 122 may be a network interface card, such as an Ethernet card, an optical transceiver, a radio frequency transceiver, or any other type of device that can send and receive information. Network interface 122 may be configured to operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards, as well as various combinations thereof.

Graphics subsystem 112 may be configured to provide dedicated graphics processing for computing device 110. As illustrated in FIG. 1, graphics subsystem 112 includes graphics processing unit 114 and graphics processing unit memory 116. Graphics processing unit 114 may be configured to receive commands and data and output pixel data. Graphics processing unit 114 may include multiple processing cores. Graphics processing unit 114 may be configured to operate according to OpenGL and/or Direct3D. Graphics processing unit 114 may operate according to a graphics pipeline process (e.g., input assembler, vertex shader, geometry shader, rasterizer, pixel shader, and output merger). Graphics processing unit memory 116 may include storage devices configured to store data generated during a graphics pipeline process.

As illustrated in FIG. 1, system memory 104 includes applications 106 and operating system 108. Applications 106 may be any applications implemented within or executed by computing device 100 and may be implemented or contained within, operable by, executed by, and/or be operatively/communicatively coupled to components of computing device 100. Applications 108 may include instructions that may cause central processing unit(s) 102 of computing device 100 to perform particular functions. Applications 106 may cause central processing unit(s) 102 to write data to or read data from a computer readable medium, such as for example, system memory 104 and/or storage device(s) 118. Applications 106 may include algorithms which are expressed in computer programming statements, such as, for loops, while-loops, if-statements, do-loops, etc.

As further illustrated in FIG. 1, applications 106 may execute on top of operating systems 108. Operating systems 108 may be configured to facilitate the interaction of applications with central processing unit(s) 102, and other hardware components of computing device 100. Operating system 108 may be an operating system designed to be installed on laptops and desktops. For example, operating system 108 may be a Windows® operating system, Linux, or Mac OS. Operating system 108 may be an operating system designed to be installed on laptops, desktops, smartphones, tablets, set-top boxes, and/or gaming devices. For example, operating system 108 may be a Windows®, Linux, Mac OS, Android, iOS, Windows Mobile®, or a Windows Phone® operating system. It should be noted that although techniques are describe herein according to a particular example operating system, the techniques described herein are not limited to a particular operating system.

Figure 2:
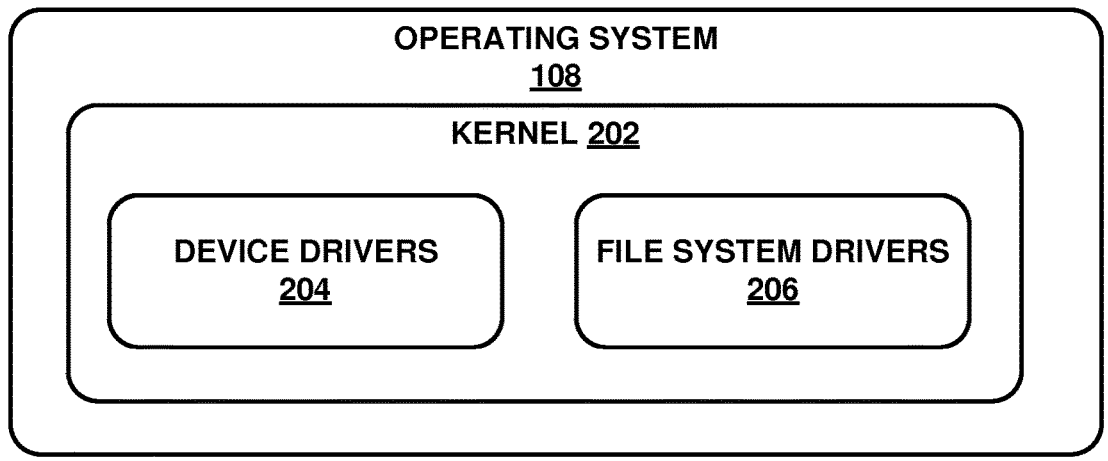
FIG. 2 is a block diagram illustrating an example of an operating system of a computing device that may implement one or more techniques of this disclosure.

FIG. 2 is a block diagram illustrating an example of an operating system of a computing device that may implement one or more techniques of this disclosure. As illustrated in FIG. 2 operating system 108 includes kernel 202. In one example, kernel 202 may be a kernel based on a Linux kernel. In other examples, kernel 202 may simply be a component or subset of instructions of an operating system. As illustrated in FIG. 2, kernel includes device drivers 204 and file system drivers 206. Device drivers 204 may be configured to operate as an interface between operating system 108 and hardware devices, such as, for example, system interface 110. File system drivers 206 may be configured to provide a layer of abstraction between applications 106 and/or operating system 108 and a storage device, such as, for example system memory 104 and/or storage device(s) 118.

For example, file system drivers 206 may allow an application to modify an inode on storage device(s) 118 without requiring the application to perform aspects of file management. Modifying an inode may include any type of data change within a volume, from creating, modifying, renaming, or deleting a file to creating, modifying, renaming, moving, or deleting a directory. As described in detail below, modifying an inode may include modifying a boot record, modifying directory entries, modifying a file allocation table, modifying an allocation bitmap, allocating clusters, and deallocating clusters. In one example, file system drivers 206 may be configured to allow data to be stored to system memory 104 and/or storage device(s) 118 according to a file system based on a File Allocation Table (FAT) file system, including FAT12, FAT16, FAT32, exFAT, and transactional exFAT files systems. In one example, file system drivers 206 may be implemented as one driver binary that implements both FAT and exFAT file systems. In other examples, file system drivers 206 may include a separate binary driver for each of FAT and exFAT file systems.

Figure 3:
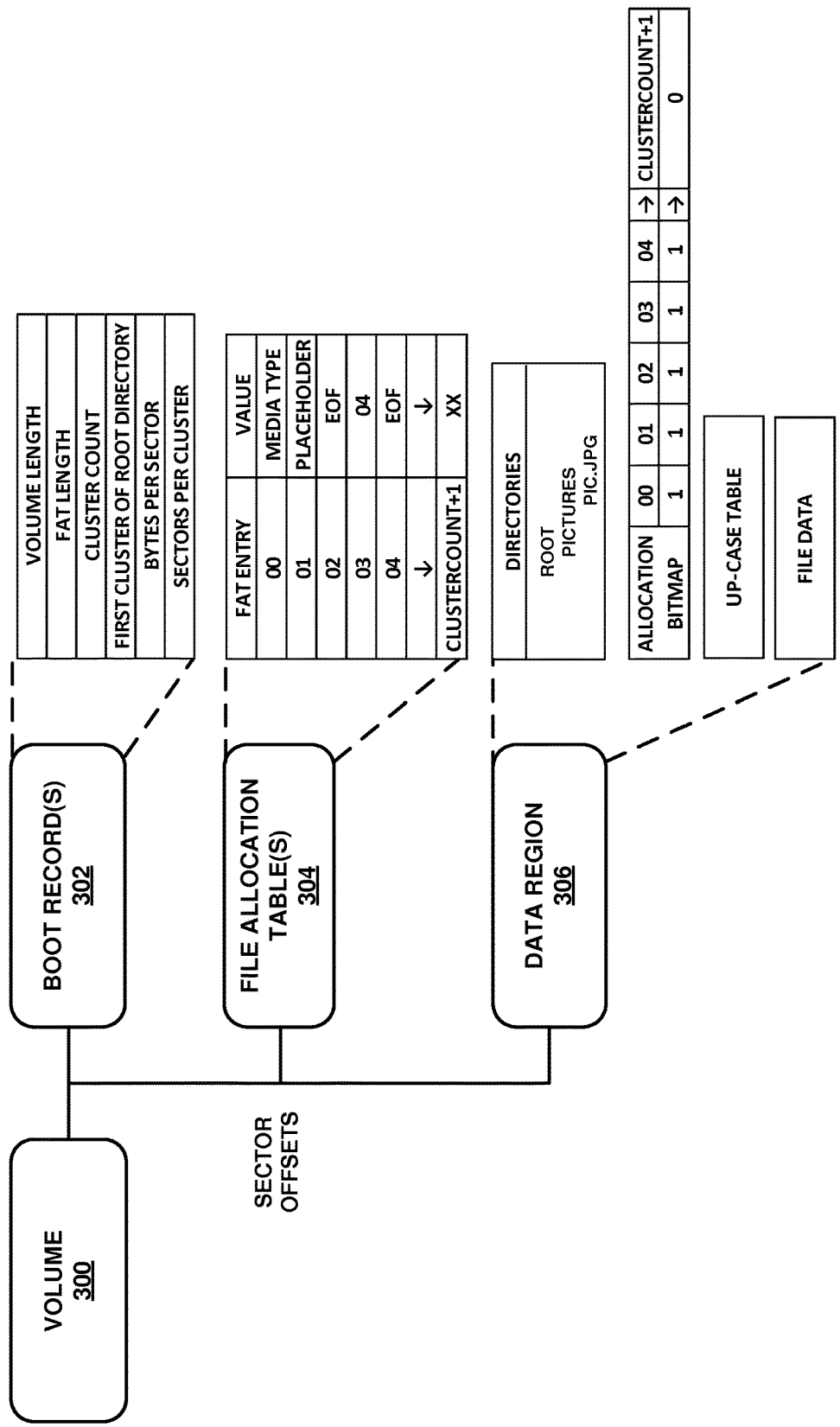
FIG. 3 is a conceptual diagram illustrating an example of a volume defined according to an example file system.

FIG. 3 is a conceptual diagram illustrating an example of a volume defined according to an example file structure. In one example, volume 300 may be defined according to the exFAT file system. It should be noted that although in some examples volume 300 is described with respect to an exFAT file system, the techniques described herein are not limited to an exFAT file system and may be used with other file systems, including, for example, FAT12, FAT16, and FAT32. Further, it should be noted that example volume 300 represents an illustrative example of a volume and, for the sake of brevity, is not intended as an exhaustive description of a volume defined according to a file system. Additional details of a volume may be found in a corresponding file system specification. For example, in the case where volume 300 is defined according to a file system based on the exFAT file system, additional details of volume 300 may be found in the Microsoft exFAT Revision 1.00 File System Basic Specification (fourth release, 1 Jan. 2009). For example, in the case where volume 300 is defined according to a file system based on the one or more of the FAT12, FAT16, and FAT32 file systems, additional details of volume may be found in the Microsoft Extensible Firmware Initiative FAT32 File System Specification (version 1.03 Dec. 6, 2000).

In the example, illustrated in FIG. 3, volume 300 includes boot record(s) 302, file allocation table(s) 304, and data region 306. Each of boot record(s) 302, file allocation table(s) 304, and data region 306 may be addressable on a storage device, such as, and for example, storage device(s) 118, according to a sector value. Boot record(s) 302 include data entries describing file system parameters. In one example, boot record(s) 302 include data for bootstrapping the volume, fundamental file system parameters for the volume, and various error checking information. Boot record(s) 302 may include one or more boot records. In one example, boot record(s) 302 includes a primary boot record and a backup boot record, where the backup boot record is a replica of the primary boot record. The example volume 300 illustrated in FIG. 3 generally corresponds to a volume defined according to exFAT. It should be noted that in the case wherein example volume 300 corresponds to a volume defined according to FAT12, FAT16, and FAT32 data region 306 may not include an allocation bitmap. It should also be noted, however, that techniques described herein may be applicable to both volumes defined according to an exFAT files system and/or volumes defined according to FAT12, FAT16, and FAT32 file systems.

As illustrated in FIG. 3, examples of information included in boot record(s) 302 include volume length, file allocation table length, cluster count, first cluster of root directory, bytes per cluster, and sectors per cluster. In one example, volume length specifies the size of the volume 300 in sectors. In one example, file allocation table length specifies the size of a file allocation table 304 in sectors. In one example, cluster count specifies the number of clusters included in data region 306. In one example, first cluster of root directory specifies a sector location of the root directory in data region 306. In one example, bytes per cluster specifies the number of bytes included in a sector. In one example, the number of bytes per sector may be expressed in power of 2 notation and may range from a minimum of 512 bytes per sector to a maximum of 4096 bytes per sector. In one example, sectors per cluster specifies the number of sectors per cluster. In one example, the minimum number of sectors per cluster may be one and the maximum number of sectors per cluster may provide for a maximum cluster size of 32 MB. Although not illustrated in FIG. 3, boot record(s) 302 may also include information indicating a percentage of clusters which are allocated and information that allows volume 300 to be boot-strapped. As described in detail below, boot record(s) 302 may be updated as files and directories are modified.

File allocation table(s) 304 may include one or more file allocation tables. In one example, file allocation table(s) 304 includes a single file allocation table 304. In another example, file allocation table(s) 304 includes two or more file allocation tables. File allocation table(s) 304 may be used to describe a sequence of clusters (also, referred to as a chain of clusters) that are assigned to an inode, such as a file, in data region 306. As illustrated in FIG. 3, a file allocation table may include an entry and a value corresponding to the entry. In the example illustrated in FIG. 3, entry 00 includes a value indicating a media type and entry 01 includes a placeholder value. Entries 02 through ClusterCount+1 may provide information describing sequences of clusters assigned to an inode. In one example, entries may include a value indicating a subsequent cluster entry in a sequence of clusters, a value indicating a "bad" cluster, a value indicating that the cluster is not in use, or a value indicating the end of a sequence of clusters (EOF).

In the example illustrated in FIG. 3, root file directory begins at cluster 02. As illustrated in FIG. 3, entry 02 includes an EOF marker which indicates that the root directory is not assigned any additional clusters. Further, in the example illustrated in FIG. 3, a file begins at cluster 03. As illustrated in FIG. 3, entry 03 includes an address of 04, indicating that the next cluster in the sequence for the file is cluster 04. Entry 04 includes an EOF marker which indicates that the file is not assigned any additional clusters. In this manner, file allocation table(s) may be used to identify a sequence of clusters allocated to an inode. It should be noted that although in the example illustrated in FIG. 3 that the clusters allocated to an inode are consecutive, in other examples, clusters allocated to an inode may include clusters that are not consecutive (e.g., entry 03 pointing to entry 07).

Data region 306 may be the region of volume 300 where data that makes up an inode is stored. For example, data region 306 may include file data representing a media file, such as, for example, a JPEG file. In some examples, data region 306 may be referred to a cluster heap. As described above, information regarding the configuration of data region 306 may be included in boot record 302 (e.g., cluster count and percentage of clusters allocated). It should be noted that in most cases, boot record 302 is typically updated on a mounting event. As further described above, clusters in data region 306 may form part of a sequence which is defined in file allocation table(s) 304. Thus, a modification to an inode stored in data region 306 may require file allocation table(s) 304 to be updated.

As illustrated in FIG. 3, data region includes directories, allocation bitmap, UP-case table, and file data. Directories may include a series of entries describing a tree structure which indicates a relationship between files and directories. For example, directories may indicate that a particular file is stored in a sub-directory of a parent directory. In the example illustrated in FIG. 3, directories include a root directory and a "pictures" sub-directory and a picture file, PIC.jpg, stored within the pictures directory. In the example illustrated in FIG. 3, the root directory may include general information about the volume and the data region, for example, the location of the allocation bitmap, when the volume includes an allocation bitmap.

Figure 4B:

In one example, a directory entry associated with an inode may include one or more records of different types. FIG. 4A and FIG. 4B are conceptual diagrams illustrating examples of directory entries that includes records associated with an inode. Example directory entry 400 illustrated in FIG. 4A generally corresponds to a directory record defined according to exFAT. Example directory entry 450 illustrated in FIG. 4B generally corresponds to a directory record defined according to FAT12, FAT16, and FAT32. As illustrated in FIG. 4B, a directory record defined according to FAT12, FAT16, and FAT32 includes one or more long name directory entry records and does not include a stream extension record or a file name extension record.

As illustrated in FIG. 4A, directory entry 400 includes directory entry record 402, stream extension record 404, and file name extension record(s) 406. Directory entry record 402, stream extension record 404, and file name extension record(s) 406 may be defined according to a file system specification, such as, for example, exFAT. In the example of exFAT, each record may be 32 bytes and may be generally formatted as illustrated in FIG. 4A. In the example of exFAT, the order of directory entry record 402, stream extension record 404, and file name extension record(s) 406 in one or more sectors may be as follows: directory entry record 402, stream extension record 404, and file name extension record(s) 406. It should be noted that example directory entry 400 represents an illustrative example of a directory entry defined according to a file system and, for the sake of brevity, an exhaustive description of a directory entry defined according to a file system is not provided herein. Additional details of a directory entry 400 may be found in a corresponding file system specification. For example, in the case where directory entry 400 is defined according to a file system based on the exFAT file system, additional details of directory entry 400 may be found in the Microsoft exFAT Revision 1.00 File System Basic Specification (fourth release, 1 Jan. 2009).

As illustrated in FIG. 4A, information describing a name of an inode, a first cluster of an inode, and the data size of an inode are included in directory entry 400. Directory entry record 402 includes DOS file flags and time data. In one example, DOS file flags may include information indicating whether a file is read-only file, a hidden file, a system file, or an archive file. Time data may include information indicating when a file has been created, accessed, and/or modified.

Referring again to FIG. 4A, stream extension record 404 includes information identifying the first cluster of an inode and the data size of the inode. As illustrated in FIG. 4A, stream extension record 404 also includes a NO_FAT_CHAIN flag located at BYTE 1. In one example, NO_FAT_CHAIN flag indicates whether an inode is described as a cluster chain in a file allocation table. In one example, NO_FAT_CHAIN flag may be defined according to the exFAT file system. In the exFAT file system, NO_FAT_CHAIN flag may be a one bit value where "0" indicates that a cluster chain is valid and "1" indicates that a cluster chain is not used. In one example, an inode may not need to be described as a cluster chain in a file allocation table when it is contained within a single cluster. In another example, an inode may not need to be described in a file allocation table when it is contained within contiguous clusters.

In the case where an inode is contained within contiguous clusters and the NO_FAT_CHAIN flag is set, the first cluster value, data size value, and the bytes per sector and sectors per cluster values in boot record(s) 302 may be used to retrieve the inode. That is, the number of bytes allocated to the inode can be divided by the cluster size to give a number of contiguous clusters allocated to the inode, where the allocated clusters start at the specified starting cluster. It should be noted that although some file systems, such as, for example FAT12, FAT16, and FAT32 may not include a NO_FAT_CHAIN flag in a directory entry, the techniques described herein may be used with file systems that do not include a NO_FAT_CHAIN flag.

File name extension record(s) 406 includes a type value and inode identifying information, i.e., a file name. Directory entry 400 may include one or more file name extension records. The number of file name extensions records may be based on the length of a filename. As illustrated in FIG. 4A, directory entry record 402 and stream extension record 404 also include type values. In one example, each of the type values may include a bit indicating whether an inode has been deleted. In one example, setting a first bit of type value to 0 may indicate that an inode has been deleted. Thus, as described in detail below, data included in each of directory entry record 402, stream extension record 404, and file extension record(s) 406 may be updated when an inode is modified.

Referring to FIG. 4B, directory entry 450 includes directory entry record 452 and may include one or more long name directory entry record(s) 454. Directory entry 450 may be defined according to a file system specification, such as, for example, FAT12, FAT16, and FAT32. In the example of FAT12, FAT16, and FAT32, the order of directory entry record 452 and one or more long name directory entry record(s) 454 may be as follows: one or more long name directory entry record(s) 454 and directory entry record 452. That is, the long name directory entry record(s) 454 may precede the directory entry record 452 in a logical sequence of one or more sectors. It should be noted that example directory entry 450 represents an illustrative example of a directory entry defined according to a file system and, for the sake of brevity, an exhaustive description of a directory entry defined according to a file system is not provided herein. Additional details of a directory entry 450 may be found in a corresponding file system specification. For example, in the case where directory entry 450 is defined according to a file system based on the one or more of the FAT12, FAT16, and FAT32 file systems, additional details of the directory entry 450 may be found in the Microsoft Extensible Firmware Initiative FAT32 File System Specification (version 1.03 Dec. 6, 2000).

In the example illustrated in FIG. 4B, directory entry record 450 includes information describing a name of an inode, and a first cluster of an inode. Directory entry record 452 and long name directory entry record 454 includes DOS file flags and time data. In one example, DOS file flags may include information indicating whether a file is read-only file, a hidden file, a system file, or an archive file. Time data may include information indicating when a file has been created, accessed, and/or modified. Further, long name directory entry record 454 includes long name character values, a checksum, and an ORDINAL value at BYTE 0. An ORDINAL value may indicate that a long name directory entry record is the first entry in a long name directory entry set. The CHECKSUM value at BYTE 13 may be a checksum of NAME at BYTE 0-10 of directory entry record 452.

In a similar manner to that described above with respect to directory entry 400, values of directory entry 450 may indicate whether an inode has been deleted. In one example, the first byte of directory entry record 452 and corresponding bytes of any associated long name records may be set to a default value indicating that a directory entry record is not in use. In one example, the default value may be hexadecimal value 0xE5. Thus, as described in detail below, data included in each of directory entry record 452 and long name directory entry record(s) 454 may be updated when an inode is modified.

Referring again to FIG. 3, allocation bitmap may maintain the allocation state of the clusters in data region 304 and may be used to determine which clusters in a volume are currently available to write to, i.e., not currently allocated. As illustrated in the example of FIG. 3, allocation bitmap includes an entry corresponding to each cluster of data region 306, where a binary value of "1" indicates that a particular cluster is allocated and a binary value of "0" indicates that a cluster is unallocated. It should be noted that although some file systems, such as, for example FAT12, FAT16, and FAT32 may not include an allocation bitmap, the techniques described herein may be used with file systems that do not include an allocation bitmap.

In the example of exFAT, UP-case table may contain data for converting lower-case characters to upper case characters. For example, UP-case table may include an array of Unicode characters. In the example of exFAT, file names may be stored in a case insensitive manner and file names may be converted to upper-case during search operations. It should be noted that in the examples of FAT12, FAT16, and FAT32, data region 306 does not include UP-case table. File data may include data representing a file, such as, for example, a JPEG file.

As described above, operating system 108 and/or file system drivers 206 may be configured to store data to a storage device, such as storage device(s) 118 according to a volume defined by a file system specification. In one example, operating system 108 and/or file system drivers 206 may be configured to allocate clusters, deallocate clusters, create an inode, delete an inode, and/or rename an inode. Operating system 108, file system drivers 206 and/or other components of computing device 100 may be configured to perform any combination of the techniques for allocating clusters, deallocating clusters, creating an inode, deleting an inode, and/or renaming an inode described herein. Operating system 108 and/or file system drivers 206 may further be configured to examine storage devices, such as, for example, storage device(s) 118, and correct common errors. One way operating system 108 and/or file system drivers 206 may locate errors is by comparing a volume allocation bitmap with the disk sectors assigned to files in the file system. fsck is a command available in Linux that may be used to check and optionally repair a volume defined according to a file system. chkdsk is a command available in Windows® operating systems that may be used to check and optionally repair a volume defined according to a file system.

It should be noted that some inode modifications involve more than one sector and thus are not atomic (single sector writes are considered to be atomic). For non-atomic operations partial writes may occur. That is, one sector may be updated while another is not due to a failure. File system driver 206 may be configured to ensure that no existing data is lost nor corrupted when a partial write occurs. Further, file system driver 206 may be configured such that after a partial write occurs any ensuing corruption is repaired the next time the volume is mounted and/or the data is accessed.

File system driver 206 may also be configured to deal with partial writes when reading them after a failure event. In the case where a partial write occurs with respect to an exFAT volume, the checksum field in the first directory entry (i.e., the file record) may not have the correct value. For example, a case may occur where a directory entry record is the last directory entry record in the sector and the following stream record is the first directory entry record in the next logical sector and an update to the stream record was made which caused the checksum to be updated, but the second sector write was never made to a disk due to a failure event. In this case file system driver 206 may be configured to determine that the directory entry record was updated, but the remaining records were not.

In this case, file system driver 206 may be configured to calculate a new checksum and write it to the file record directory entry in the first sector to enact a repair, i.e., make data consistent again. It should be noted that the reason that calculating a new checksum is acceptable is that in this case each of the directory entry records in a set are self-consistent. That is, file name extension records, for example, (at least never when they span a sector) are never updated and thus they are irrelevant for consistency purposes and the directory entry record does not contain anything referring to the stream extension record and the stream extension record does not have anything referring to the directory entry record. Thus, if even if these records are not matched, the volume is still consistent, except for the invalid checksum, which the file system driver 206 may be configured to fix as described above.

As described above, clusters allocated to an inode may be described by having a first cluster specified in a directory entry corresponding to the inode. In the example of exFAT inodes with the NO_FAT_CHAIN flag cleared and in the example of inodes of other FAT file system (e.g., FAT12/16/32), a file allocation table describes a chain of clusters with file allocation table entries. That is, the first cluster entry in the file allocation table contains the cluster number of a second cluster and the second and any subsequent cluster entries contain subsequent cluster numbers until a cluster entry containing an end of cluster chain marker (EOF) is reached. When an inode is modified, for example, when the size of a file is increased or decreased, the number of clusters in a chain may be correspondingly increased or decreased. As such, a file allocation table may be modified to indicate a new end of cluster chain.

Figure 5:
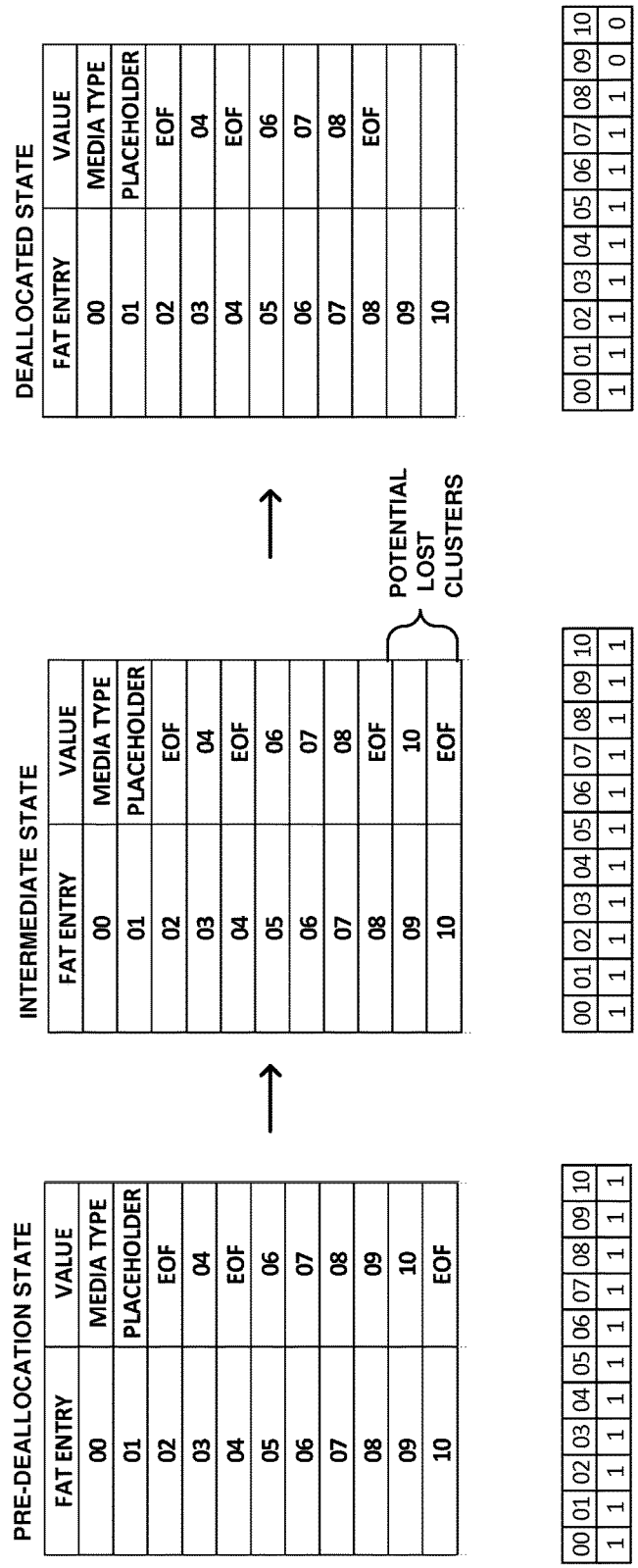
FIG. 5 is a conceptual diagram illustrating an example of deallocating clusters assigned to an inode according to one or more techniques of this disclosure.

FIG. 5 is a conceptual diagram illustrating an example of deallocating clusters assigned to an inode according to one or more techniques of this disclosure. In one example, techniques illustrated in FIG. 5 may be performed by computing device 100 and/or file system driver 206. The example illustrated in FIG. 5 illustrates how a file allocation table and/or an allocation bitmap, such as, for example, file allocation table(s) 304 and allocation bitmap illustrated in FIG. 3 may be modified when clusters are deallocated from an inode. Clusters may be deallocated from an inode when the size of a file is reduced. In some examples, deallocating clusters from an inode may also be referred to as shrinking the allocation of an inode.

FIG. 5 illustrates a file allocation table and a corresponding bitmap at three states: a pre-deallocation state, an intermediate state, and a deallocated state. In the example illustrated in FIG. 5, an inode is initially allocated clusters 05, 06, 07, 08, 09 and 10 (at pre-deallocation state) and modified to be allocated clusters 05, 06, 07, and 08 (at deallocated state). As illustrated in FIG. 5, at the intermediate state, the file allocation table entry corresponding to cluster 08 is modified to indicate that it is the last cluster allocated to the inode. As further illustrated in FIG. 5, at the intermediate state, file allocation table entries corresponding to clusters 09 and 10 are not modified from the pre-deallocated state. However, as illustrated in FIG. 5 file allocation table entries corresponding to clusters 09 and 10 are modified at the deallocated state.

Thus, according to the example illustrated in FIG. 5, when clusters are deallocated from an inode, file system driver 206 may ensure that the end of chain terminator (EOF) value is written into the new last cluster file allocation table entry (i.e., entry 08) and only after the end of chain terminator value is written to the new last cluster, then file system driver 206 marks the remaining clusters as free (i.e., entries 09 and 10). Further, as described above, an allocation cluster bitmap may also describe which clusters are in use or free. As illustrated in FIG. 5, the allocation bitmap may be updated after the intermediate state. That is, the allocation bitmap may be updated subsequent to the system driver 206 writing the chain terminator value to the new last cluster.

By marking the new end of chain terminator before marking clusters as free, it becomes less likely that a file allocation table chain of an inode will become corrupt in the event of a failure, e.g., a power loss. That is, even if a failure occurs between the pre-deallocation state and the deallocated state, the worst possible outcome is that some clusters are marked as in use in the file entry table, but nothing points to them, i.e. they are lost clusters. Further, updating the allocation bitmap after the file allocation table is updated, may further ensure that a computing device does not process clusters as free when they are not. In one example, lost clusters in a file allocation table may be fixed by a future fsck run or a chkdsk run. A fsck run or a chkdsk run may be performed when a storage device is mounted. In another example, a driver, such as, for example, file system driver 206, may perform a cluster use analysis after initial mount and mark any such lost clusters as unused, effectively doing an on-line fsck-like pass concerned with cluster use only.

Figure 6:
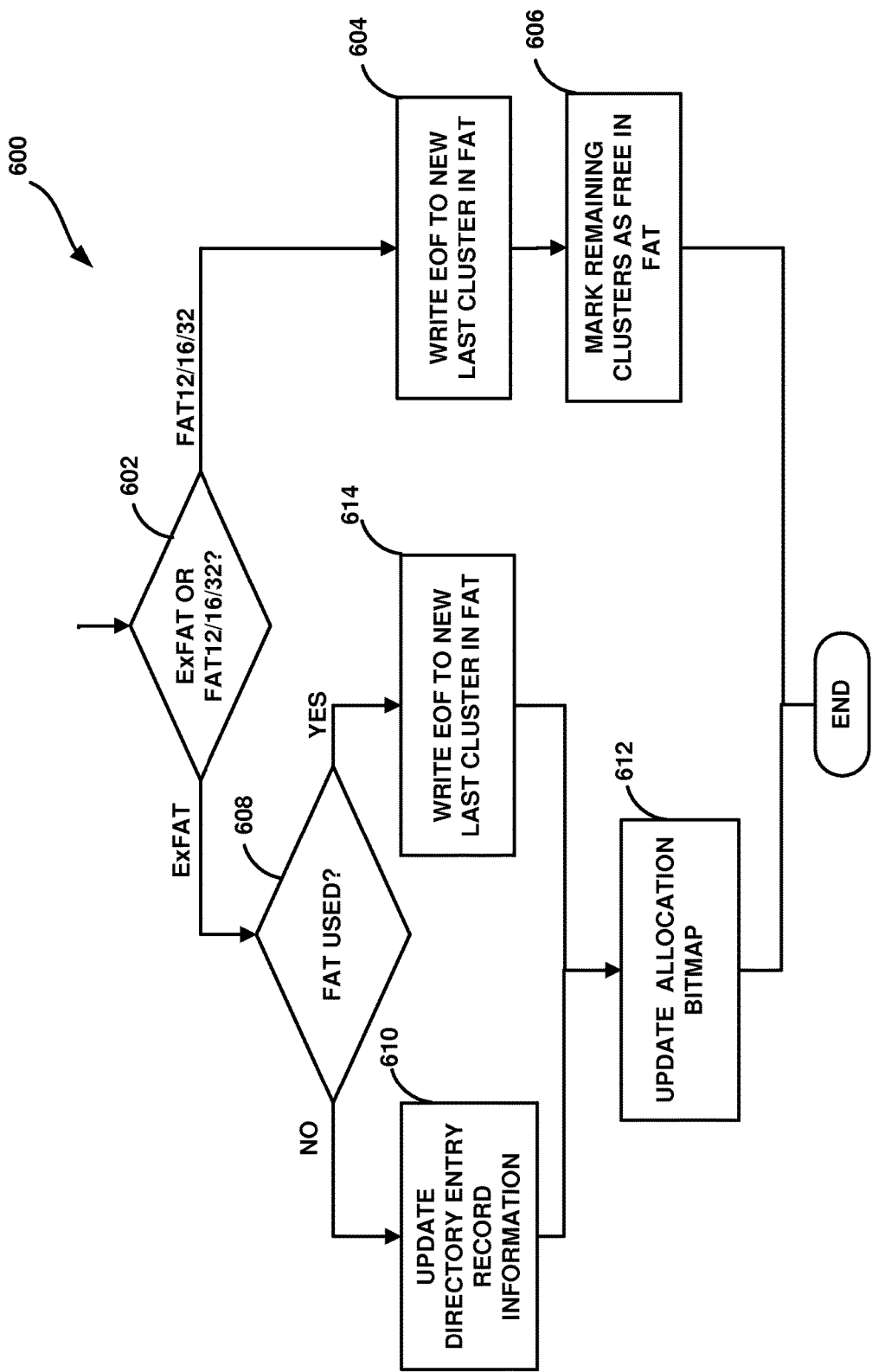
FIG. 6 is a flowchart illustrating an example of deallocating clusters assigned to an inode according to one or more techniques of this disclosure.

FIG. 6 is a flowchart illustrating an example of deallocating clusters assigned to an inode according to one or more techniques of this disclosure. As described above, a file system driver, such as, for example, file system driver 206 may be configured to deallocate clusters for a volume defined according to an exFAT files system and/or volumes defined according to FAT12, FAT16, and FAT32 file systems. Flowchart 600 provides example techniques for deallocating clusters for a volume defined according to an exFAT file system and/or a FAT12, FAT16, and FAT32 file system. Although described with respect to file system driver 206, the techniques illustrated in FIG. 6 may be performed by computing device 100 and any combination of components thereof.

As illustrated in FIG. 6 file system driver 206 determines whether a volume is defined according to an exFAT file system or is defined according to one of a FAT12, FAT16, or FAT32 file system (602). In one example, file system driver 206 may make a determination based on information included within a boot record. Upon determining that a volume is defined according to one of a FAT12, FAT16, or FAT32 file system, file system driver 206 deallocates clusters by writing an end of chain terminator (EOF) value into new last cluster file allocation table entry (604) and only after the end of chain terminator value is written to the new last cluster entry, then file system driver 206 marks the remaining clusters as free (606). As described above, with respect to FIG. 5, this may ensure that the worst possible outcome in the event of a failure is lost clusters.

As described above, for exFAT inodes that have the NO_FAT_CHAIN flag set, a file allocation table is not used and a directory entry may give the number of contiguous clusters allocated to the inode starting at the specified starting cluster. Thus, unlike for a volume defined according to one of a FAT12, FAT16, or FAT32 file system, for a volume defined according to an exFAT file system deallocation of clusters assigned to an inode will not necessarily require that a file allocation table be updated. As illustrated in FIG. 6, upon determining that a volume is defined according to an exFAT file system, file system driver 206 determines whether the inode uses a file allocation table to describe the cluster chain (608). In one example, file system driver 206 may determine whether the inode uses a file allocation table to describe the cluster chain based on whether the NO_FAT_CHAIN flag is set, as described above.

Upon determining that a file allocation table is not used to describe a cluster chain of an inode, file system driver 206 updates directory entry record information (610). In one example, updating directory information may include updating one or more of the fields described with respect to FIG. 4A. In one example, updating directory entry information may include updating one or more of a checksum, time data, valid data length, and data size. As illustrated in FIG. 6, subsequent to updating directory records, files system driver updates allocation bitmap (612). In the case of deallocating clusters for an inode that is not described in a file allocation table (e.g., NO_FAT_CHAIN set) by updating an allocation bitmap only after directory information has been updated, the worst possible outcome in the event of a failure may be that the allocation bitmap is inconsistent with the directory entries. However, such inconsistencies will only result in allocation bitmap indicating cluster are allocated when they are not, i.e., possible lost clusters.

Referring again to FIG. 6, upon determining that a file allocation table is used to describe a cluster chain of an inode file system driver 206 deallocates clusters by writing an end of chain terminator (EOF) value into new last cluster file allocation table entry (614). After writing an end of chain terminator (EOF) value into new last cluster file allocation table entry, file system driver 206 subsequently updates allocation bitmap (612). As described above with respect to FIG. 5, this may ensure that the worst possible outcome in the event of a failure is lost clusters. In this manner, computing device 100 represents an example of a device configured to write an end of chain terminator value into a new last cluster of a file access table entry and subsequently, mark one or more remaining clusters as free.

Figure 7:
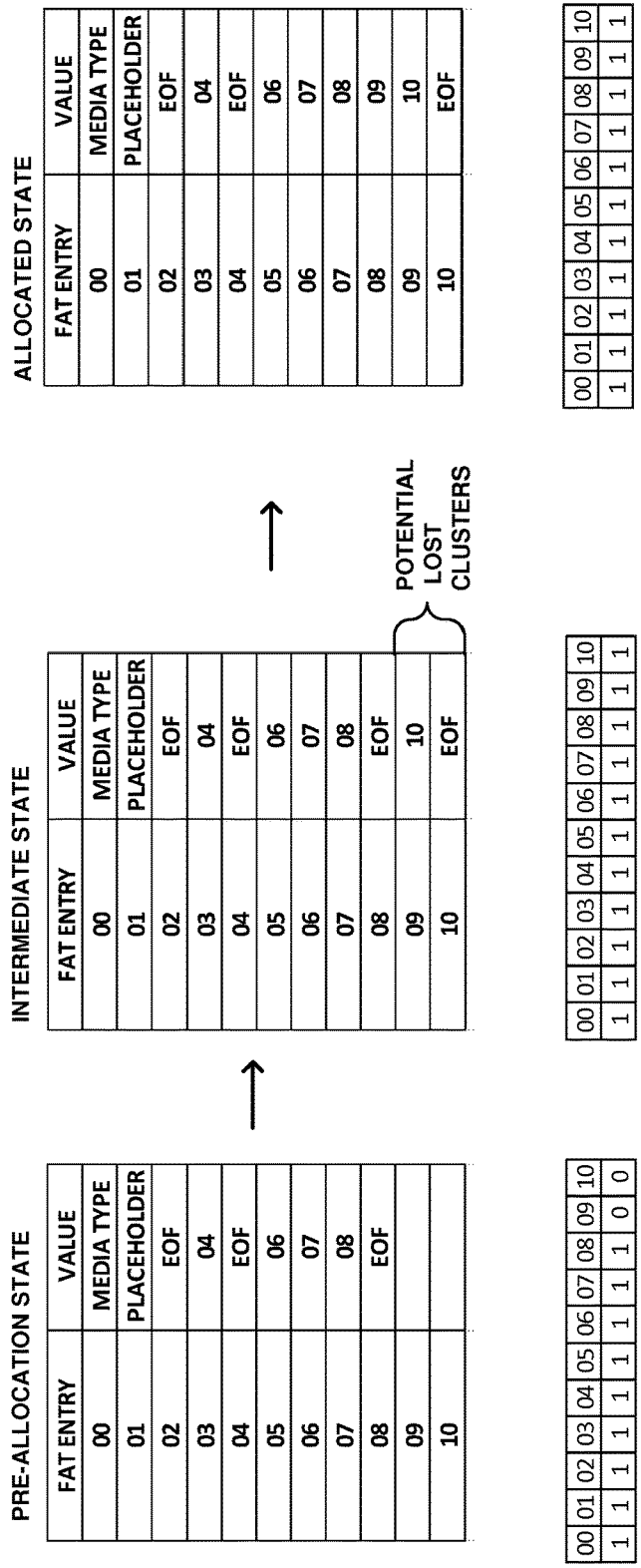
FIG. 7 is a conceptual diagram illustrating an example of allocating additional clusters to an inode according to one or more techniques of this disclosure.

As described above, in addition to decreasing a file size and deallocating an inode, modifying an inode may also include increasing a file size and allocating additional clusters to an inode. FIG. 7 is a conceptual diagram illustrating allocating additional clusters to an inode according to one or more techniques of this disclosure. In one example, techniques illustrated in FIG. 7 may be performed by computing device 100 and/or file system driver 206. The example illustrated in FIG. 7 illustrates how a file allocation table and/or an allocation bitmap, such as, for example, file allocation table(s) 304 and an allocation bitmap illustrated in FIG. 3 may be modified when clusters are allocated to an inode. In some examples, allocating clusters to an inode may also be referred to as extending the allocation of an inode.

FIG. 7 illustrates a file allocation table and a corresponding bitmap at three states: a pre-allocation state, an intermediate state, and an allocated state. In the example illustrated in FIG. 7, an inode is initially allocated clusters 05, 06, 07, and 08 (at pre-allocation state) and is modified to be allocated clusters 05, 06, 07, 08, 09, and 10 (at allocated state). As illustrated in FIG. 7, at the intermediate state, the file allocation table entry corresponding to cluster 09 is modified to point to cluster 10 and the file allocation table entry corresponding to cluster 10 is modified to indicate that it is the last cluster allocated to the inode. As further illustrated in FIG. 7, at the intermediate state, file allocation table entry corresponding to clusters 08 has not been updated. However, as illustrated in FIG. 7 file allocation table entry corresponding to cluster 08 is updated at the allocated state.

Thus, according to the example illustrated in FIG. 7, when clusters are allocated to an inode, file system driver 206 may ensure file allocation table entries for the newly allocated clusters (i.e., entries 09 and 10) are written before the previously last cluster file allocation table entry is updated (i.e., entry 08). That is, in this example, entry 08 is updated so that it points to the next cluster instead of containing the "end of chain terminator" only after entries 09 and 10 are updated. Further, in the example, illustrated in FIG. 7, the allocation bitmap may be updated before the file allocation table is updated. That is, the allocation bitmap may be updated before file system driver 206 writes new values to file allocation table entries.

By writing values to newly allocated clusters before updating the previous end of chain terminator, it becomes less likely that a file allocation table chain of an inode will become corrupt in the event of a failure, e.g., a power loss. That is, even if a failure occurs between the pre-allocation state and the allocated state, the worst possible outcome is that some clusters are marked as in use in the file entry table, but nothing points to them, i.e. they are lost clusters. Further, updating the allocation bitmap before the file allocation table is updated, may further ensure that a computing device does not process clusters as free when they are not. In a manner similar to that described above with respect to FIG. 5, lost clusters in a file allocation table may be fixed by a future fsck run or a chkdsk run and/or file system driver 206, may perform a cluster use analysis after initial mount and mark any such lost clusters as unused, effectively doing an on-line fsck-like pass concerned with cluster use only.

Figure 8:
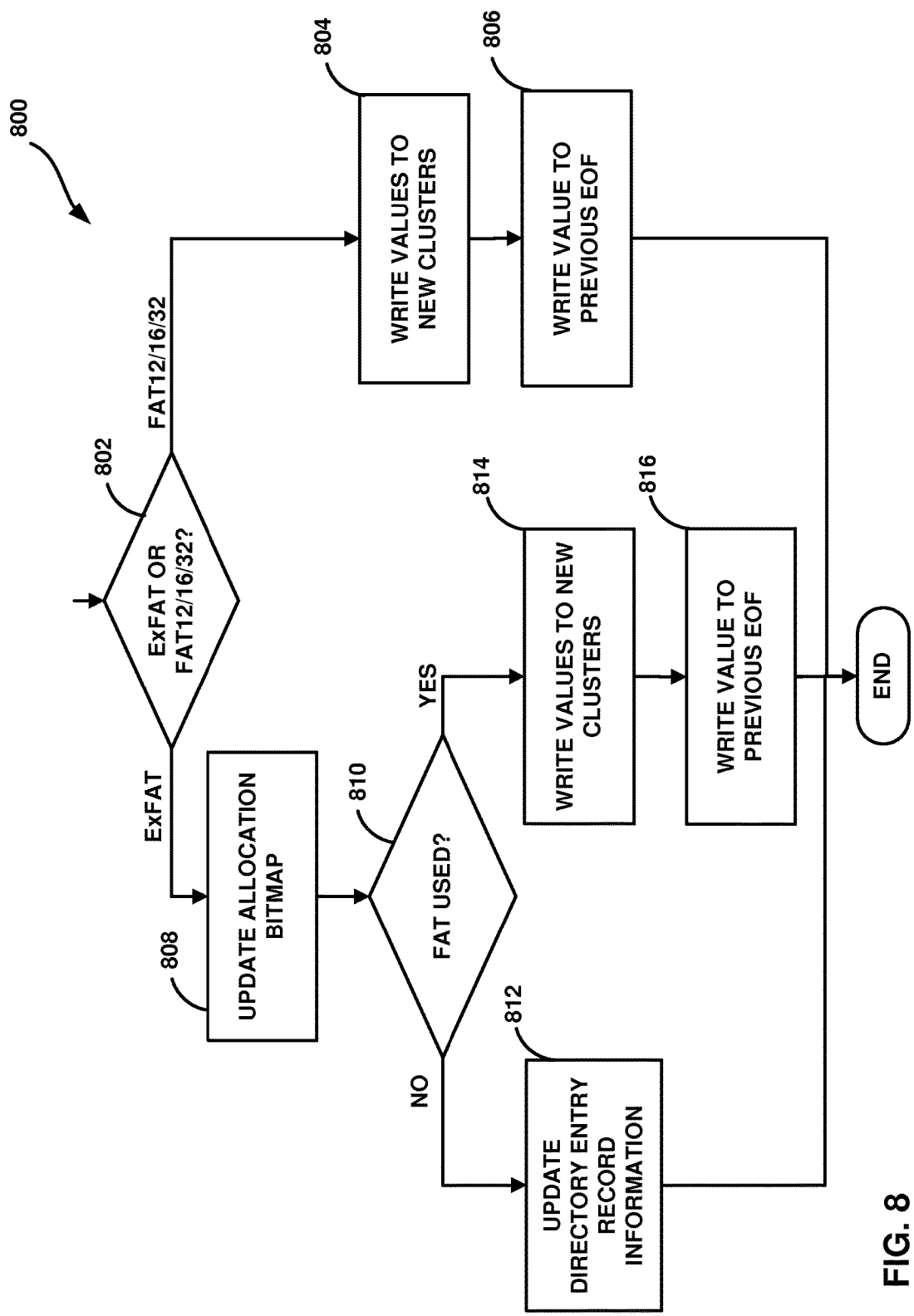
FIG. 8 is a flowchart illustrating an example of allocating additional clusters assigned to an inode according to one or more techniques of this disclosure.

FIG. 8 is a flowchart illustrating allocating additional clusters to an inode according to one or more techniques of this disclosure. As described above, a file system driver, such as, for example, file system driver 206 may be configured to allocate clusters for a volume defined according to an exFAT files system and/or volumes defined according to FAT12, FAT16, and FAT32 file systems. Flowchart 800 provides example techniques for allocating clusters for a volume defined according to an exFAT file system and/or a FAT12, FAT16, and FAT32 file system. Although described with respect to file system driver 206, the techniques illustrated in FIG. 8 may be performed by computing device 100 and any combination of components thereof. Further, it should be noted that in one example file system driver 206 may be configured to perform techniques illustrated in FIG. 8 and techniques illustrated in FIG. 6.

As illustrated in FIG. 8 file system driver 206 determines whether a volume is defined according to an exFAT file system or is defined according to one of a FAT12, FAT16, or FAT32 file system (802). In one example, file system driver 206 may make a determination based on information included within a boot record. Upon determining that a volume is defined according to one of a FAT12, FAT16, or FAT32 file system, file system driver 206 allocates clusters by writing values to new file allocation table entries (804) and only after the values have been written to the new file allocation table entries, then file system driver 206 updates the previous file allocation table entry including an end of chain terminator (EOF) (806). As described above, with respect to FIG. 7, this may ensure that the worst possible outcome in the event of a failure is lost clusters.

As described above, for exFAT inodes that have the NO_FAT_CHAIN flag set, a file allocation table is not used and a directory entry may give the number of contiguous clusters allocated to the inode starting at the specified starting cluster. Thus, unlike for a volume defined according to one of a FAT12, FAT16, or FAT32 file system, for a volume defined according to an exFAT file system allocation of clusters to an inode will not necessarily require that a file allocation table be updated. As illustrated in FIG. 8, upon determining that a volume is defined according to an exFAT file system, file system driver 206 updates an allocation bitmap (808). File system driver 206 determines whether the inode uses a file allocation table to describe the cluster chain (810). In one example, file system driver 206 may determine whether the inode uses a file allocation table to describe the cluster chain based on whether the NO_FAT_CHAIN flag is set, as described above.

Upon determining that a file allocation table is not used to describe a cluster chain of an inode, file system driver 206 updates directory entry record information (812). In one example, updating directory information may include updating one or more of the fields described with respect to FIG. 4. In one example, updating directory entry information may include updating one or more of a checksum, time data, valid data length, and data size. In the case of allocating clusters to an inode that is not described in a file allocation table (e.g., NO_FAT_CHAIN set), the allocation bitmap is updated before the file allocation table is updated, may further ensure that a computing device does not process clusters as free when they are not.

Referring again to FIG. 8, upon determining that a file allocation table is used to describe a cluster chain of an inode, file system driver 206 allocates clusters by writing values to new file allocation table entries (814) and only after the values have been written to the new file allocation table entries, then file system driver 206 updates the previous file allocation table entry including an end of chain terminator (EOF) (816). As described above with respect to FIG. 6, this may ensure that the worst possible outcome in the event of a failure is lost clusters. In this manner, computing device 100 represents an example of a device configured to write file access table entries for newly allocated clusters and subsequently, update a previously last cluster file access table entry so that it points to the next cluster.

Figure 9:
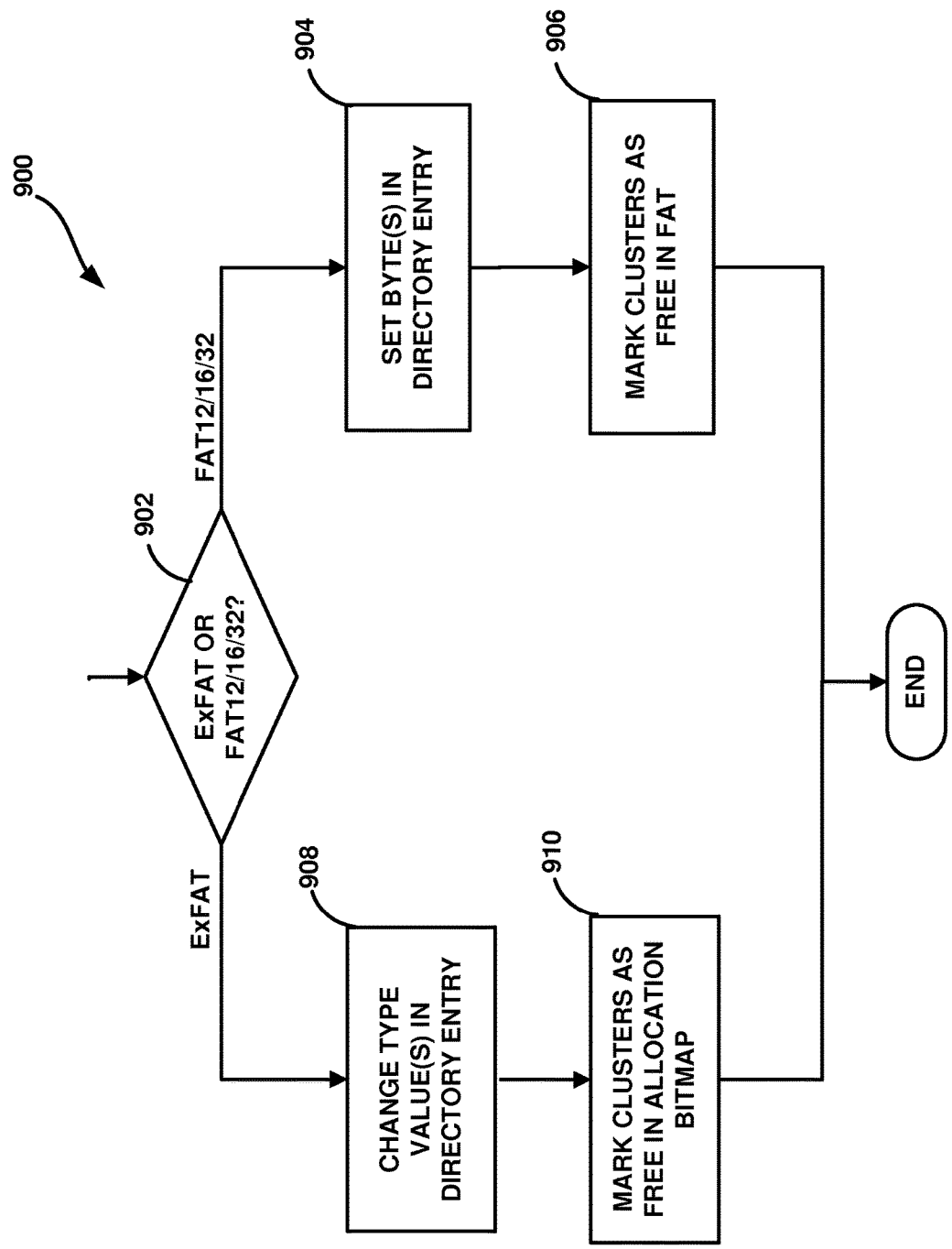
FIG. 9 is a flowchart illustrating an example of deleting an inode according to one or more techniques of this disclosure.

As described above, modifying an inode may include deleting an inode, creating an inode, or renaming an inode. File system driver 206 may be configured to delete, create, and/or rename an inode. In one example, file system driver 206 may be configured to delete an inode included as part of a volume defined according to one of a FAT12, FAT16, or FAT32 file system, and/or included as part of a volume defined according to an exFAT file system. File system driver 206 may be configured to delete inodes in a fail-safe manner. In one example, file system driver 206 may be configured to mark directory entries corresponding to an inode as not in use and subsequently, free clusters associated with the directory entries marked as not is use. That is, file system driver 206 may be configured to mark directory entries as not in use and ensure this goes to disk before anything else. FIG. 9 is a flowchart illustrating an example of deleting an inode according to one or more techniques of this disclosure.

Flowchart 900 provides example techniques for deleting inodes for a volume defined according to an exFAT file system and/or a FAT12, FAT16, and FAT32 file system. Although described with respect to file system driver 206, the techniques illustrated in FIG. 9 may be performed by computing device 100 and any combination of components thereof. Further, it should be noted that in one example file system driver 206 may be configured to perform techniques illustrated in FIG. 6, FIG. 8, FIG. 10, and/or FIG. 11 in addition to the techniques illustrated in FIG. 9.

As illustrated in FIG. 9, file system driver 206 determines whether a volume is defined according to an exFAT file system or is defined according to one of a FAT12, FAT16, or FAT32 file system (902). In one example, file system driver 206 may make a determination based on information included within a boot record. Upon determining that a volume is defined according to one of a FAT12, FAT16, or FAT32 file system, file system driver 206 sets byte(s) in a directory entry (904). As described above, with respect to FIG. 4B, in the case of FAT12, FAT16, or FAT32, the first byte of a directory entry record and corresponding bytes of any associated long name records may be set to a default value indicating that a directory entry record is not in use. Thus, in one example, file system driver 206 may set the first byte of a directory entry record and corresponding bytes of any associated long name records to a default value indicating that the directory entries records are not in use.

After directory entry records are marked as not in use, file system driver 206, marks clusters as free in a file allocation table (906). It should be noted that the freeing of clusters may be delayed for a significant amount of time if an inode is open-unlinked, i.e., it is still in use even though it has been deleted. In this case, the clusters may be freed once the file is closed for the last time. A failure occurring after the setting of byte(s) in a directory entry and before all of the clusters are marked as free may lead to lost clusters. Lost clusters may be dealt with as described above with respect to allocating and deallocating clusters for an inode.

As described above, some inode modifications may involve more than one sector (i.e., may be non-atomic). In some cases directory entries may span multiple sectors. When a directory entry spans at least two sectors, as may happen for very long file names, a failure occurring during the completion of setting bytes in directory records can lead to the first part of the entries being marked as free on disk, but the remaining records in the second sector still being marked as in use. For example, in the case of FAT12, FAT16, or FAT32, after a failure, one or more long name directory entry records (long name directory entry record(s) 454) may end up being marked as not in use and a directory entry record (e.g., directory record 452) may end up being marked as in use. In one example, file system driver 206 may be configured to address this type of failure with a fsck/chkdsk run or by a later read operation that may find only a partial directory entry record "set" at the start of a sector. After finding the partial directory entry record "set," file system driver 206 may mark the entries of the partial directory entry record "set," as not in use and thus complete the deletion.

Further, it should be noted that in the case of FAT12, FAT16, or FAT32, when deleting a inode, if the filename is long such that more than one directory entry record is used to describe the inode, and if the directory entries span two separate sectors, then, in one example, file system driver 206 may be configured to write the second sector to disk before writing the first sector to disk to ensure fail safety. In this case, the first sector may include the long name directory entry record(s) and the second sector may include a directory entry record. Thus, if failure happens between the two sector updates, by writing the second sector to disk before the first sector, a volume will then end up with ghost long name directory entry records in the first sector after a failure. That is, long name directory entry records without a consistent corresponding directory entry record. In one example, ghost long name directory entry records may be cleaned up when reading the directory. In one example, clean up may include marking ghost long name directory entry records as free.

In contrast, if a first sector is written to disk before a second sector, then upon a failure between the two sector writes, a volume will end up with the long name entry record(s) in the first sector marked free on disk, but the second sector will have some invalid/partial long name entry record(s). Although it may be possible to clean up the second sector entries by marking them as free, a short name may appear in a directory listing and not a long name. It should be noted that in some cases, a short name is normally hidden from a user in a directory listing, because there is a matching long name that is displayed instead. However, if there is no long name available, by default a short name may be displayed in a directory listing. So in this case in the event of a failure, not only has the deletion not happened, i.e. file is still there, but the file may appear to have suddenly changed names in a directory listing. For example, if MyLongNameDocument.doc was being deleted suddenly after the failure there may be MYLONG~1.DOC showing up instead in a directory listing, which may cause confusion for users and programs accessing this file. Thus, in this manner, file system driver 206 may be configured to ensure failsafe operation by ordering sector write operations.

Referring again to FIG. 9, upon determining that a volume is defined according to an exFAT file system driver 206 changes type value(s) in a directory entry (908). As described above, with respect to FIG. 4A, directory entry record, stream extension record, file name extension record include type values and each of the type values may include a bit indicating whether an inode has been deleted. Thus, in one example, file system driver 206 may set a first bit of one or more of each type value to 0 to indicate that an inode has been deleted.

After directory entry records are marked as not in use, file system driver 206, marks clusters as free in an allocation bitmap (910). As described above, with respect to marking clusters as free in a file allocation table, the freeing of clusters may be delayed for a significant amount of time if an inode is open-unlinked. In this case, the clusters may only be freed once the file is closed for the last time. Further, a failure occurring after the setting of type values and before all of the clusters are marked as free may lead to lost clusters. Lost clusters may be dealt with as described above, with respect to allocating and deallocating clusters for an inode.

In a manner similar to that described above with respect to deleting an inode included in a FAT12, FAT16, or FAT32 volume, directory entries in an exFAT volume may also span multiple sectors. In the case of exFAT, when a directory entry spans two sectors a failure occurring during the completion of setting bytes in directory records can lead to the first part of the entries being marked as free on disk (e.g., directory entry record 402), but the remaining records in the second sector still being marked as in use (e.g., stream extension record 404). As described above, in one example, file system driver 206 may address this type of failure (i.e., partial write) with a future fsck/chkdsk run or by a later read operation that may find only a partial directory entry record "set" at the start of a sector. File system driver 206 may find and mark the entry records of the partial directory entry "set" as not in use, thus completing the deletion. In this manner, file system driver 206 may be configured to delete inodes in a fail-safe manner.

Figure 10:
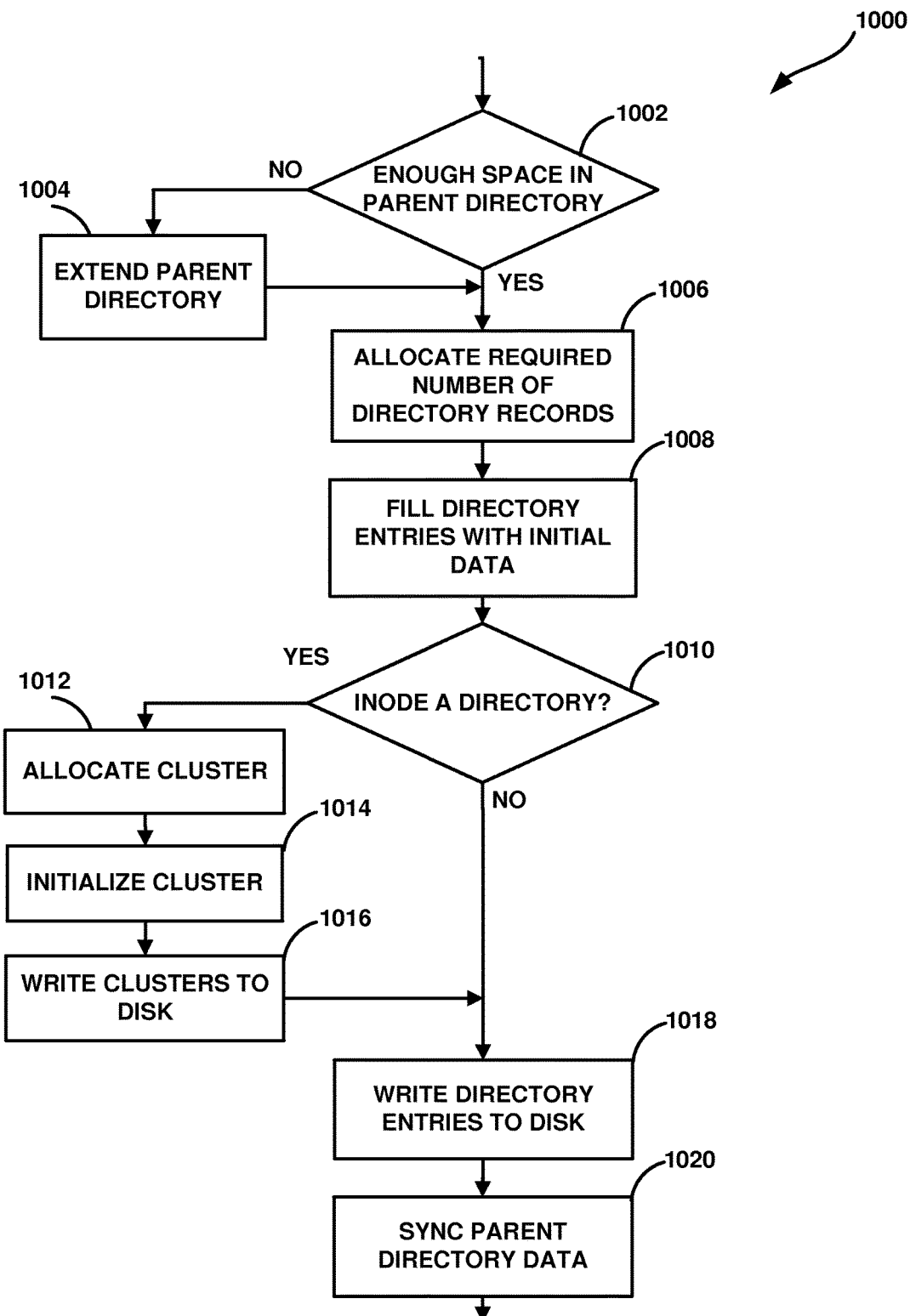
FIG. 10 is a flowchart illustrating an example of creating an inode according to one or more techniques of this disclosure.

As described above, modifying an inode may include creating an inode. In one example, file system driver 206 may be configured to create an inode included as part of a volume defined according to one of a FAT12, FAT16, or FAT32 file system, and/or for a volume defined according to an exFAT file system. File system driver 206 may be configured to create inodes in a fail-safe manner. FIG. 10 is a flowchart illustrating an example of creating an inode according to one or more techniques of this disclosure.

Flowchart 1000 provides example techniques for creating inodes for a volume defined according to an exFAT file system and/or a FAT12, FAT16, and FAT32 file system. Although described with respect to file system driver 206, the techniques illustrated in FIG. 10 may be performed by computing device 100 and any combination of components thereof. It should be noted that in some examples, file system driver 206 may be configured such that only one directory operation can happen at a time and as such there may be no need to cope with one operation impinging on another midway through. As illustrated in FIG. 10, file system driver 206 determines if there is enough space in the parent directory for an inode to be created (1002). Upon determining that there is not enough space in the parent directory, file system driver 206 extends the parent directory (1004).

In one example, file system driver 206 may extend a parent directory according to techniques described above with respect to FIG. 8. That is, file system driver 206 may be configured to, in the case of a FAT12, FAT16, and FAT32 file system, write file access table entries for newly allocated clusters and subsequently, update a previously last cluster entry in a file access table entry so that it points to a next cluster. Further, in the case of an exFAT file system, file system driver 206 may update an allocation bitmap and update directory record information, if a file allocation is not used and write file access table entries for newly allocated clusters and subsequently, update a previously last cluster entry in a file access table entry so that it points to a next cluster, if a file allocation table is user. It should be noted that if a failure event occurs after a parent directory has been extended, the result is a larger directory, which is typically not an issue.

Once a parent directory is extended such that enough space is present, file system driver allocates a required number of directory records (1006). As described above, the required number of directory records may be based on the length of an inode name. As described above, in the case of FAT12, FAT16, and FAT32 a directory entry includes directory entry record 452 and may include one or more long name directory entry record(s) 454. As described above, in the case of exFAT, a directory entry includes a directory entry record, stream extension record, and one or more file name extension records 406. File system driver 206 fills directory entries with initial data (1008). In the case of exFAT, initial data may data included in one or more of the bytes illustrated in FIG. 4A. In the case FAT12, FAT16, and FAT32, initial data may include data included in one or of the bytes illustrated in FIG. 4B.

It should be noted that in the case of FAT12, FAT16, FAT32, and exFAT a directory is not allowed to be zero size. That is, a directory is considered invalid if it does not have at least one cluster allocated to it. Thus, when creating a new directory, in the case of FAT12, FAT16, FAT32, and exFAT a cluster must always be allocated in the file allocation table for the new directory and the cluster chain is assigned to the directory entries of the new directory. Further in the case of FAT12, FAT16, and FAT32 all directories, except the root directory, must always contain the "." and ".." directory entries even in the case where the directory is otherwise completely empty.

As illustrated in FIG. 10, file system driver 206 determines whether an inode is a directory. Upon determining that an inode is a directory, file system driver 206 allocates a cluster for a directory (1012). File system driver 206 initializes a cluster (1014). In the case of FAT12, FAT16, and FAT32 initializing a cluster may include initializing a directory with the "." and ".." directory entries and zeroing out the remainder. In the case of exFAT, initializing a cluster may include zeroing out the whole cluster. After the clusters are initialized, file system driver 206 writes the clusters to disk (1016). As illustrated in FIG. 10, after clusters are written to disk, file system driver 206 writes the directory entry of the new directory to disk (1018).

According to the technique illustrated in FIG. 10, a failure event occurring at the state where clusters are allocated and initialized may lead to a lost cluster, but no other corruption. In contrast to the techniques illustrated in FIG. 10, if directory entries for a new directory were written to disk before any one of a cluster being allocated, initialized, or written to disk, a failure event could result in a directory entry on disk, but no initialized cluster to go with it, which would be a corrupt directory.

It should be noted, that if directory entries cross sector boundaries, which they may for very long file names, as described above, a failure can result in only some of the entries being written to the device. This type of failure may be dealt with a future fsck/chkdsk run or by a later read operation finding only the beginning of a valid directory entry "set" and marking the entries as not in use thus undoing the partial creation. After directory entries are written to disk, file system driver 206 may then sync the parent directory metadata to disk (1020). In one example, syncing the parent directory metadata to disk may include updating access/modification times. In this manner, file system driver 206 may be configured to create inodes in a fail-safe manner.

As described above, modifying an inode may include renaming an inode. In one example, file system driver 206 may be configured to rename an inode included as part of a volume defined according to one of a FAT12, FAT16, or FAT32 file system, and/or for a volume defined according to an exFAT file system. File system driver 206 may be configured to rename inodes in a fail-safe manner. In one example, when renaming an inode, file system driver 206 may be configured to ensure everything is prepared in a volume first and then the old directory set is synced first before the new directory entry set is written. This may ensure that a volume cannot end up with two directory entry sets (i.e., inodes) pointing at the same clusters which would effectively be cross linking. It should be noted that in the case of a failure, it is possible that the old directory entry set may be marked as not in use, yet the new one may not have been written out yet. In this case, the renamed inode may be lost completely and its clusters are lost. While this may be not desirable, it does leave the volume with consistent directory metadata. That is, neither directory is corrupt (except for multi sector updates as described above and they may be dealt with as described above). In this manner, file system driver 206 may be configured to rename an inode in a failsafe manner.

Computing device 100 and/or components thereof may perform the techniques described herein in order to allow for more fail-safe operation of a computer readable medium, such as, for example, system memory 104 and/or storage device(s) 118. In this manner computing device 100 represents an example of a device configured to enable fail-safe operations of storage devices. It should be noted that when file system driver 206 implements techniques described above a corrupt cluster chain belonging to an inode may never occur so long as computing device 100 itself does not cause random data corruption due to a failure event.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for deleting an inode associated with multiple directory entry records spanning multiple sectors, where a first sector includes a directory entry record for the inode and a second sector includes one or more other types of directory entry records for the inode, the method comprising:
   marking each of the multiple directory entry records associated with the inode as not in use according to ordered sector write operations, wherein marking each of the multiple directory entry records associated with the inode as not in use according to ordered sector write operations includes writing the first sector before writing the second sector; and
   subsequent to performing the ordered sector write operations, freeing clusters associated with the directory entry records marked as not in use.

2. The method of claim 1, wherein an inode includes a file or a directory.

3. The method of claim 1, wherein the inode is included in a volume defined according to an exFAT file system and wherein marking directory entry records as not in use includes changing a type value in the directory entry record and a stream extension record.

4. The method of claim 3, wherein freeing clusters associated with the directory entry records includes updating an allocation bitmap.

5. The method of claim 1, wherein the inode is included in a volume defined according to one of an FAT12, FAT16, or FAT32 file system and wherein marking directory entry records as not in use includes setting a byte of the directory record entry and corresponding bytes of associated long name records.

6. The method of claim 5, wherein freeing clusters associated with the directory entry records includes marking clusters as free in a file allocation table.

7. A device for modifying an inode stored to a storage device according to a defined file system, the device comprising:

a system interface that enables data to be transferred to a storage device including an inode stored to the storage device according to a defined file system; and one or more processors configured to:

delete an inode associated with multiple directory entry records spanning multiple sectors in a failsafe manner, where a first sector includes a directory entry record for the inode and a second sector includes one or more other types of directory entry records for the inode, wherein deleting an inode associated with multiple directory entry records spanning multiple sectors in a failsafe manner includes:

marking each of the multiple directory entry records associated with the inode as not in use according to ordered sector write operations, wherein marking each of the multiple directory entry records associated with the inode as not in use according to ordered sector write operations includes writing the first sector before writing the second sector; and subsequent to performing the ordered sector write operations, freeing clusters associated with the directory entry records marked as not in use.

8. The device of claim 7, wherein the one or more processors are further configured to allocate one or more clusters to an inode in a failsafe manner and wherein allocating one or more clusters to an inode in a failsafe manner includes:

writing file access table entries for newly allocated clusters for the inode; and subsequent to writing file access table entries for the newly allocated clusters, updating a previously last cluster entry for the inode in a file access table entry so that it points to a next cluster.

9. The device of claim 8, wherein the one or more processors are further configured to deallocate one or more clusters to an inode in a failsafe manner and wherein deallocating one or more clusters assigned to an inode in a failsafe manner includes:

writing an end of chain terminator value for the inode into a new last cluster entry of a file allocation table; and subsequent to writing the end of chain terminator value into the new last cluster entry, marking the one or more deallocated clusters previously assigned to the inode as free in respective entries of a file allocation table.

10. The device of claim 9, wherein an inode is included in a volume defined according to one of an FAT12, FAT16, or FAT32 file system and wherein marking directory entry records as not in use includes setting a byte of the directory record entry and corresponding bytes of associated long name records.

11. The device of claim 7, wherein the one or more processors are further configured to deallocate one or more clusters to an inode in a failsafe manner and wherein deallocating one or more clusters assigned to an inode in a failsafe manner includes:

writing an end of chain terminator value for the inode into a new last cluster entry of a file allocation table; and subsequent to writing the end of chain terminator value into the new last cluster entry, marking the one or more deallocated clusters previously assigned to the inode as free in respective entries of a file allocation table.

12. The device of claim 7, wherein the one or more processors are further configured to deallocate one or more clusters to an inode in a failsafe manner and wherein deallocating one or more clusters assigned to an inode in a failsafe manner includes:

writing an end of chain terminator value for the inode into a new last cluster entry of a file access table; and subsequent to writing file access table entries for the newly allocated clusters, updating an allocation bitmap.

13. A non-transitory computer-readable storage medium comprises instructions stored thereon, that upon execution, cause one or more processors of a device to:

mark each of multiple directory entry records associated with the inode having multiple directory entry records spanning multiple sectors, where a first sector includes a directory entry record for the inode and a second sector includes one or more other types of directory entry records for the inode, as not in use according to ordered sector write operations, wherein marking each of the multiple directory entry records associated with the inode as not in use according to ordered sector write operations includes writing the first sector before writing the second sector; and free clusters associated with the directory entry records marked as not in use subsequent to performing the ordered sector write operations.

14. The non-transitory computer-readable medium of claim 13, wherein the inode is included in a volume defined according to an exFAT file system and wherein marking directory entry records as not in use includes changing a type value in the directory entry record and a stream extension record.

15. The non-transitory computer-readable medium of claim 14, wherein freeing clusters associated with the directory entries includes updating an allocation bitmap.

16. The non-transitory computer-readable medium of claim 13, wherein the inode is included in a volume defined according to one of an FAT12, FAT16, or FAT32 file system and wherein marking directory entry records as not in use includes setting a byte of the directory record entry and corresponding bytes of associated long name records.

17. The non-transitory computer-readable medium of claim 16, wherein freeing clusters associated with the directory entry records includes marking clusters as free in a file allocation table.

* * * * *